UNITED STATES PATENT OFFICE.

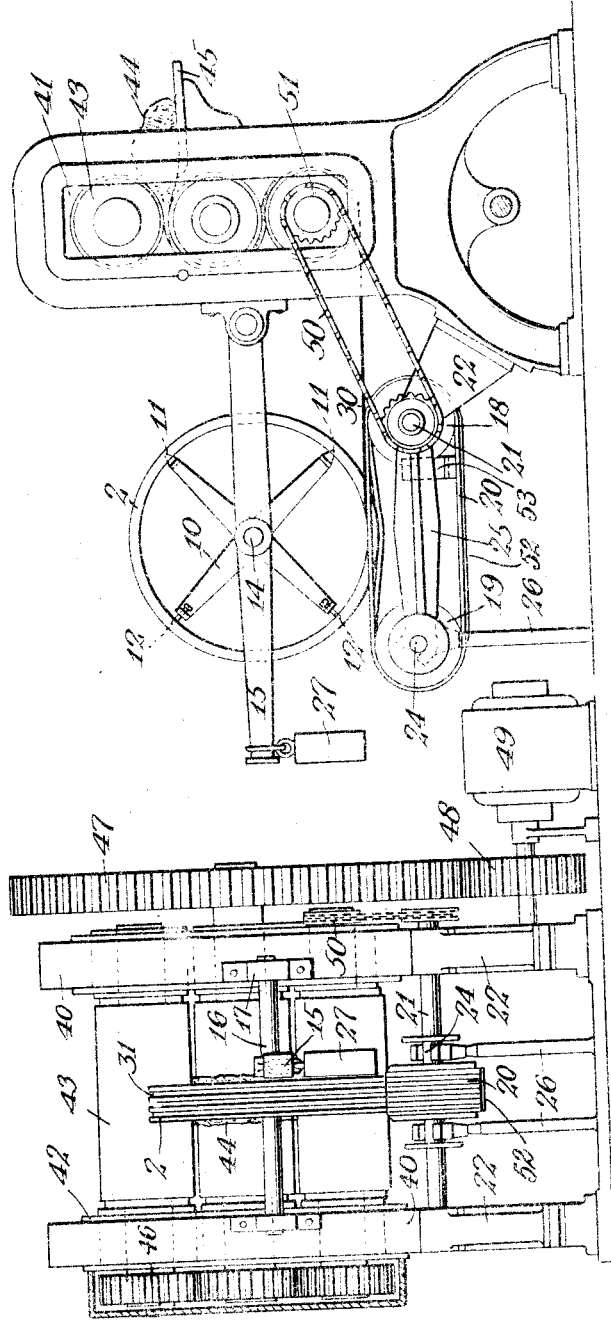

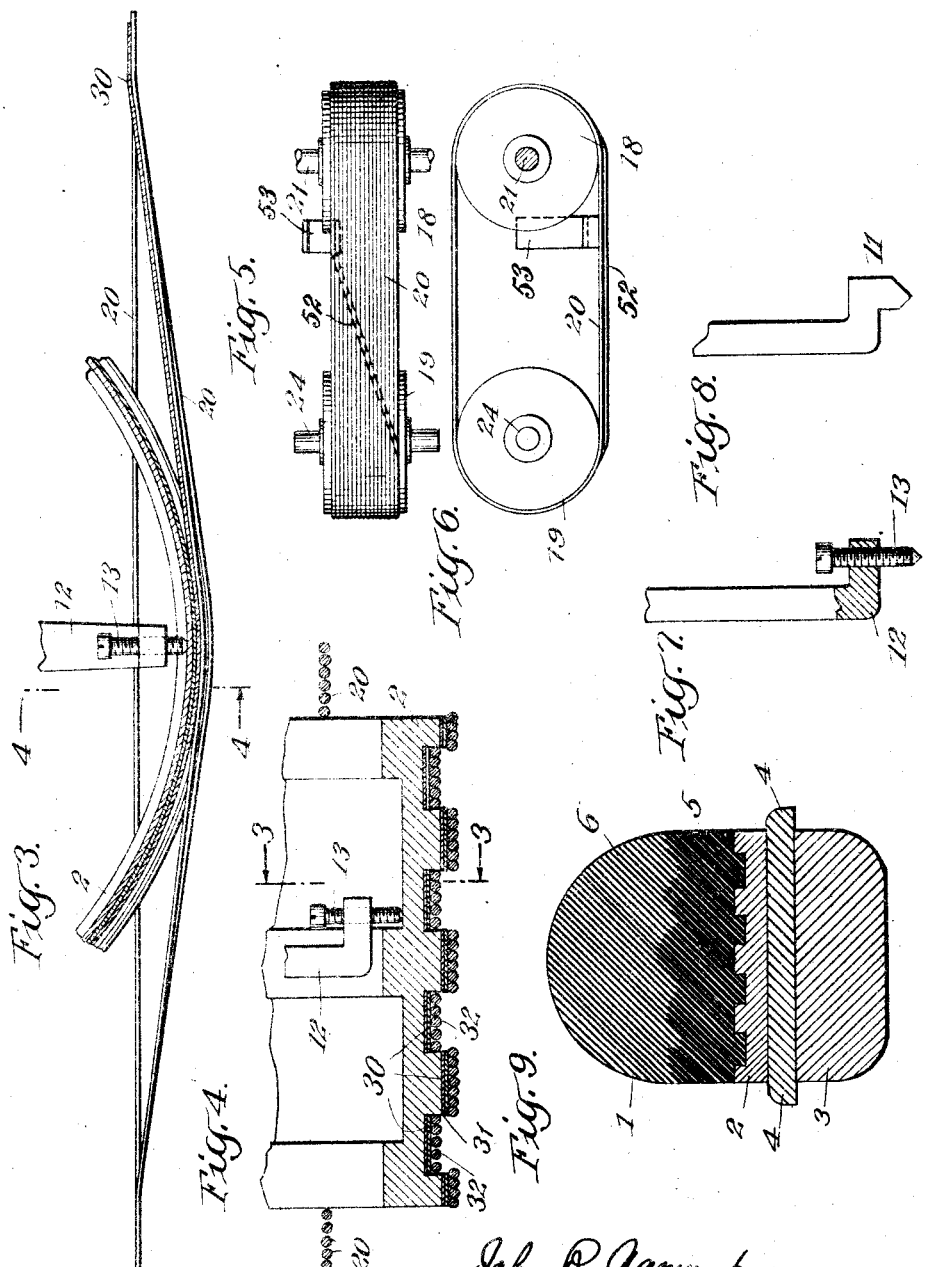

JOHN R. GAMMETER AND WALTER H. ALLEN, OF AKRON, OHIO, ASSIGNORS TO THE B. F. GOODRICH COMPANY, OF NEW YORK, N. Y., A CORPORATION OF NEW YORK.

APPARATUS FOR MAKING TIRES.

1,183,552.  Specification of Letters Patent.  Patented May 16, 1916.

Original application filed November 11, 1910, Serial No. 591,770. Divided and this application filed January 15, 1913. Serial No. 742,128.

*To all whom it may concern:*

Be it known that we, JOHN R. GAMMETER and WALTER H. ALLEN, citizens of the United States, residing in the city of Akron, county of Summit, and State of Ohio, have invented certain new and useful Improvements in Apparatus for Making Tires, of which the following is a specification.

This invention relates to improvements in apparatus designed for the building up of solid rubber tires or similar articles, in accordance with the methods set forth and described in our pending application, Serial Number 591,770, filed November 11, 1910, of which said application the present application is a division.

Solid rubber tires have heretofore been made in which the body of the tire of resilient material was vulcanized to and carried by a harder composition, which latter was in turn vulcanized to and carried by a metallic band capable of being attached to a rim mounted upon the felly of a wheel in a simpler and more rigid manner than was attainable in the attaching of the rubber tire directly to the channel or rim of a wheel. Difficulties have been experienced, however, in applying the rubber compound to the metallic base or rim, particularly where the latter was grooved or otherwise roughened to cause the rubber to interlock with it and adhere to it closely.

Our invention comprises improved processes by which the rubber compound can be evenly laid upon the metal base or rim and forced into any grooves formed in the rim for the purpose of interlocking with the rubber, forming the subject-matter of our prior application, and particularly to an improved machine for practising said processes, forming the subject-matter of the present divisional application.

In the accompanying drawings which form a part of this specification, and in which a preferred embodiment of our invention is shown by way of illustration, Figure 1 is a front elevation of a machine embodying our improvements; Fig. 2 is a side elevation of the same, the driving gear and roll carrying journal boxes being omitted for the sake of clearness; Fig. 3 is a longitudinal sectional view on an enlarged scale illustrating the action of the wire belt in rolling the rubber compound upon the rim; Fig. 4 is a section on line IV—IV of Fig. 3; Fig. 5 is a plan, and Fig. 6 is a side elevation of the wire belt and drums carrying the same; Figs. 7 and 8 are detail views of portions of the arms of the rim carrying spider, and Fig. 9 is a transverse section through a completed tire made with our machine and shown mounted upon a wheel felly.

Referring to the drawings in detail and particularly to Fig. 9, it will be seen that the form of the tire which it is desired to make, comprises a tire body or tire proper 1 of resilient material molded upon and preferably vulcanized to a metal base or rim 2, adapted to be secured by flanges, not shown, or in any other suitable manner, to a steel rim 4, shrunk or otherwise mounted upon the wheel felly 3. The resilient portion of the tire may be formed throughout of homogeneous compound, but we prefer to make the same in at least two layers, the inner one of which 5, which engages directly with the metallic rim, being preferably formed of a compound of such nature that when vulcanized it will become comparatively hard. Upon this layer of compound is laid an outer layer 6, compounded in such a way that when subjected to the vulcanizing action it will acquire the proper resiliency to render it capable of acting as a cushion and to make it suitable for engagement with the road surface. The entire tire is preferably vulcanized at one operation, but the nature of the compounds forming the layers 5 and 6 is such that when the same degree of vulcanization each assumes the desired degree of hardness. The ingredients and composition of such compounds are well known and need not be further described here.

Referring now to our apparatus, the same comprises a spider or chuck 10, capable of supporting the rim 2. The spider preferably comprises a series of arms, shown as four, two of which have pointed ends 11, which engage within the rim, while the ends of the other two arms are bent at right angles, as indicated at 12 in Fig. 7, pointed set screws passing through the openings in the portions 12. The set screws are drawn back and the rim applied to the spider, being rested upon the pointed ends 11, when the set screws may be screwed out and caused to engage portions of the rim opposite to those engaged by points 11.

The spider 10 is journaled upon a stud-shaft 14 projecting from an arm 15 supported at one end from a shaft 16, journaled in bearings 17 secured to a fixed support. It is obvious that in place of the spider any other suitable means for rotatably supporting the rim may be employed. Below the rim is mounted a pair of drums 18 and 19 which carry a wire belt or series of wire belts 20. Each belt may be formed of a single endless wire passed a number of times over the drums, which are preferably grooved, or may be formed of a plurality of individual endless wires. The former is the preferred construction, as a greater uniformity of tension on the different turns is attainable. In this construction, the turns of the endless wire pass around the drums lying in grooves therein which serve to guide the turns and keep them all parallel, excepting the single length of wire 52 passing diagonally from the outermost groove of one drum to the outermost groove of the other drum, across the lower run of the belt. This diagonal return strand 52 is guided to its groove on the receiving drum 18 by a fixed hand 53 which changes the direction of this strand from oblique to parallel. The shaft 21 of the drum 18 is journaled in a bracket 22 projecting from a fixed support, a sprocket 23 being secured to the shaft and receiving power from any suitable source in order to rotate the drum 18 and drive the belt 20. The shaft 24 of the drum 19 is journaled in bearings formed in the ends of a pair of arms 25 pivoted to the shaft 21 of the drum 18, the ends of these pivoted arms being supported in any suitable manner, as upon standards 26.

The periphery of the rim 2 rests upon the upper run of the wire belt and is pressed thereagainst by its own weight and that of the arm 15, which may be supplemented, if necessary, by hanging a weight 27 upon the end of the arm 15. The layer of rubber compound 30 is fed upon the belt 20 and carried by the latter into engagement with the rim upon which it is rolled. The separate wires of the belt force the rubber into engagement with the rim, following the contour of the latter whether regular or otherwise. For instance, if the rim is provided with undercut circumferential grooves 31, as shown, some of the wires 32 will enter these grooves, and roll the rubber compound thoroughly thereinto. Thus the wires provide a belt consisting of separate yieldable elongated portions whose surfaces will urge the rubber to conform to any unevenness of the rim. The wire, being elastic or yieldable, will give under tension and permit the distribution of the rubber in an even manner and to a uniform thickness on the rim. As will be obvious, flat bands may be used, if desired, in place of the round wires shown, but the latter are preferable as the pressure which they exert upon the material to be rolled upon the rim is localized and their action is therefore more effectual. The strip of rubber compound 30, may be supplied to the belt in any desired manner, but it is preferable to mount the apparatus above described adjacent to a calendering machine, utilizing the frames 40 of the latter as the support for the bearings 17 and brackets 22.

The calendering machine may be of any well-known construction, that shown comprising the upright frames 40 having vertical openings 41 therein in which slide the journal boxes 42 carrying the massive metal rolls 43. The mass of rubber compound 44 is fed from a platform 45 between the upper pair of calendering rolls, passing in a strip around the middle roll, between the middle and lower roll, and around and beneath the latter to the belt 20. The rolls 43 are geared together by means of spur gears 46, one of the rolls, preferably the middle one, carrying the large gear 47 driven from a pinion 48 carried on the shaft of a motor 49, or in any other suitable manner. The power for driving the belt 20 may conveniently be taken from one of the rolls, as, for example, by means of a chain 50 passing over the sprocket 23 and over a sprocket 51 secured to the projecting end of the journal of the lower roll.

In the making of tires according to our invention, we preferably provide a number of calendering machines having attached thereto the apparatus above described for rolling the rubber compound upon the rims, one complete machine being provided for each of the different compounds to be incorporated in the tire. The rim is then placed upon the machine feeding the compound to be used for the base of the tire and put in operation. The strip of compound 30 passes between the rolls and upon the traveling belt 20, which rolls it upon the rim while such compound is still warm and tacky, causing the latter to revolve through frictional contact. When the rubber has been rolled upon the rim to a sufficient thickness, the rim is removed and placed upon the second machine, which applies the compound for forming the outer part of the tire. After enough of this has been rolled upon the rim, the rim and tire are placed in a mold and subjected to a vulcanizing action, which cures the rubber and causes the same to adhere firmly to the metal rim.

We have shown in the drawings and described in detail one specific modification of our invention, but the same is chosen merely for purposes of illustration, and we do not desire to be limited to the exact construction set forth.

Having thus described our invention, we claim:

1. In a machine for forming a resilient tire tread upon a rim, in combination, means for revolubly supporting the rim, means adapted to engage the periphery of said rim comprising a member exerting a localized pressure over at least one portion of said rim or an uncompleted tread thereon, and means for feeding rubber compound between said member and said rim.

2. In a machine for forming a resilient tire tread upon a rim, in combination, means for revolubly supporting the rim, a belt having yieldable portions adapted to engage the periphery of said rim and to localize the pressure thereon, and means for feeding rubber compound between said belt and said rim.

3. In a machine for forming a resilient tire tread upon a rim, in combination, means for revolubly supporting the rim, and a power-driven belt having separate yieldable portions engaging the periphery of said rim.

4. In a machine for forming a resilient tire tread upon a rim, in combination, a belt having separate elastic portions adapted to conform to unevennesses in the rim and supported in substantially horizontal position, and means for revolubly supporting the rim in a vertical position above said belt, the weight of said rim being carried by said belt.

5. In a tire making machine, a fixed support, an arm pivoted thereto, means carried by said arm for revolubly supporting the rim, and a belt having separate yieldable portions under tension mounted below said rim in engagement with the periphery thereof.

6. In a tire making machine, a support for the tire and an endless compound applying belt comprising a plurality of longitudinally separate sections.

7. In a tire making machine, a support for the tire and an endless compound applying belt comprising a plurality of substantially parallel strands of wire.

8. In a machine for forming a resilient tire tread upon a rim, in combination, means for revolubly supporting the rim, and an endless belt formed of a plurality of strands of wire in engagement with said rim.

9. In a machine for forming a resilient tire tread upon a rim, in combination, means for revolubly supporting the rim, and an endless belt formed of a plurality of strands of wire in engagement with said rim, means for driving said belt, and means for urging said rim in the direction of said belt.

10. In a machine for forming a resilient tire tread upon a rim, in combination, means to support said rim, a set of calendering rolls, and means for receiving a rubber compound from said rolls in a continuous strip and applying said strip to the periphery of said rim comprising a member exerting a localized pressure over at least one portion of said rim or the uncompleted tread thereon.

11. In a machine for forming a resilient tire tread upon a rim, in combination, a set of calendering rolls, means for revolubly supporting the rim, and a belt having separate yieldable portions mounted adjacent to the periphery of said rim and receiving the rubber compound from said rolls in a continuous strip and applying said strip to the rim.

12. In a machine for forming a resilient tire tread upon a rim, in combination, a set of calendering rolls, an endless belt having separate yieldable portions receiving the rubber compound from said rolls, and means for supporting the rim in contact with said belt.

13. In a machine for making solid rubber tires, means for supplying a continuous strip of plastic sheet rubber compound, and means for applying said strip in layers of uniform thickness upon a rim base presenting an uneven periphery.

14. In a machine for making solid rubber tires, means for supplying a continuous strip of plastic sheet rubber compound, and means for applying said strip in layers of uniform thickness upon both the even and uneven portions of a rim base presenting a grooved periphery.

15. In a machine for making rubber tires, means for supplying a continuous strip of plastic sheet rubber compound, and means for rolling said strip upon both the ridges and grooves of the periphery of a rim base presenting an uneven periphery, said means automatically adapting itself to the uneven periphery of said rim base.

16. In a machine for forming a resilient tire tread upon a rim, in combination, a set of calendering rolls, a frame therefor, an arm pivoted to said frame to swing in a substantially vertical plane, means carried by said arm for revolubly supporting the rim, and an endless belt supported beneath said arm and having a substantially horizontal run upon which the periphery of the rim rests, said belt receiving the rubber compound from said set of rolls in a continuous strip and applying the same to the periphery of said rim.

17. In a machine for forming a resilient tire tread upon a rim, in combination, a set of calendering rolls, a frame therefor, an arm pivoted to said frame to swing in a substantially vertical plane, means carried by said arm for revolubly supporting the rim, a bracket carried by said frame, a horizontal shaft journaled in bearings on said bracket, a drum mounted on said shaft, a second shaft substantially parallel to said first shaft, a drum mounted on said second shaft, an endless belt carried by said drums and having a substantially horizontal upper run upon which the periphery of said rim rests and by which said rim and its carrying arm are supported, and means for driving said belt.

18. In a machine for forming a resilient tire tread upon a rim, in combination, a set of calendering rolls, a frame therefor, an arm pivoted to said frame to swing in a substantially vertical plane, a shaft carried by said arm, said shaft being substantially parallel to the axes of said rolls, a spider mounted on said shaft and provided with means for engaging the rim, a bracket carried by said frame, a shaft journaled in bearings carried by said bracket, said shaft being parallel to the axes of said rolls, a drum mounted on said shaft, a second drum rotatable about an axis substantially parallel with the axis of said shaft, an endless belt comprising a plurality of strands of wire carried by said drums, the upper run of said belt being substantially horizontal and engaging the periphery of said rim and supporting the same, and the spider and arm upon which the rim is mounted, means for driving said rolls, and means for transmitting power from said rolls to the drum carried by said bracket.

19. In a machine for forming a resilient tire upon a rim, in combination, means for supporting a rim, means adapted to engage the periphery of said rim comprising a member having a yieldable portion exerting a localized pressure over one portion of the rim, and means for feeding rubber compound between said member and said rim.

20. In a machine for forming a resilient tire upon a rim, in combination, means for supporting the rim, a belt having yieldable portions adapted to engage the periphery of the rim, and means to drive said belt to thereby impart motion to said rim.

21. In a machine for forming a resilient tire upon a rim, in combination, a frame, means for supporting a rim thereon, a power-driven belt having separate yieldable portions adapted to engage the periphery of said rim, said power-driven belt being supported by said frame below said rim.

22. In a machine for forming a resilient tire upon a rim, in combination, a frame, means for supporting a rim thereon, a power-driven belt having separate yieldable portions adapted to engage the periphery of said rim, said power-driven belt being supported upon grooved rolls held by said frame.

23. In a machine for forming a resilient tire upon a rim, a framework, an arm pivotally supported by said framework and adapted to hold a rim in position, a belt having separate yieldable portions adapted to engage the periphery of said rim, said belt being mounted upon and driven by a grooved roll retained by said framework, and a second grooved roll supporting the belt at a different point, said belt in its passage between said rolls being substantially horizontal.

24. In a machine for forming a resilient tire upon a rim, in combination, a framework, a rotatably held arm projecting therefrom, means on said arm for retaining a rim in upright position, and an endless wire belt having a series of substantially parallel strands supported by said framework beneath said arm and adapted to engage, from side to side, the periphery of said rim.

25. In a machine for forming a resilient tire upon a rim, in combination, means for supporting the rim, a power-driven belt having separate yieldable portions engaging the periphery of said rim, and means for feeding rubber compound between said member and said rim.

26. In a machine for forming a resilient tire upon a rim, in combination, means for supporting the rim, a power-driven belt having separate yieldable portions engaging the periphery of said rim, and means for feeding rubber compound between said member and said rim comprising a set of calendering rolls adapted to form a thin sheet of rubber compound, said rolls being positioned to deliver the sheet upon said belt and to thereby bring it in contact with the periphery of said rim.

27. In a machine for forming a resilient tire upon a rim, in combination, a framework, calendering rolls mounted therein, a rubber supply for feeding between said rolls, means to support a rim upon said frame in a position opposite said rolls, and a power-driven belt supported by said frame below said rim-supporting means, said belt being adapted to contact with the periphery of said rim and to urge rubber compound received from the calendering rolls into contact with said rim.

JOHN R. GAMMETER.
WALTER H. ALLEN.

Witnesses:
R. M. PIERSON,
WALTER K. MEANS.